United States Patent
Riccio et al.

(10) Patent No.: US 11,442,425 B2
(45) Date of Patent: Sep. 13, 2022

(54) METHOD TO STORE PROGRAMS FOR OPERATOR INTERFACE AND THE MANAGEMENT OF AUTOMATION MACHINES AND/OR PLANTS AND CORRESPONDING SOFTWARE PRODUCT, OR PROJECT FORMAT FOR THE EXECUTION OF THE METHOD

(71) Applicant: ASEM s.r.l., Casale sul Sile (IT)

(72) Inventors: Alberto Riccio, Verona (IT); Maurizio Fumagalli, Meda (IT)

(73) Assignee: ASEM S.R.L., Artegna (IT)

( * ) Notice: Subject to any disclaimer, the term of this patent is extended or adjusted under 35 U.S.C. 154(b) by 0 days.

(21) Appl. No.: 17/056,991

(22) PCT Filed: May 21, 2019

(86) PCT No.: PCT/IT2019/050111
§ 371 (c)(1),
(2) Date: Nov. 19, 2020

(87) PCT Pub. No.: WO2019/224855
PCT Pub. Date: Nov. 28, 2019

(65) Prior Publication Data
US 2021/0165385 A1    Jun. 3, 2021

(30) Foreign Application Priority Data
May 21, 2018    (IT) .................. 102018000005547

(51) Int. Cl.
*G06F 9/455* (2018.01)
*G06F 9/44* (2018.01)
(Continued)

(52) U.S. Cl.
CPC ............ *G05B 19/056* (2013.01); *G06F 8/65* (2013.01); *G05B 2219/13004* (2013.01)

(58) Field of Classification Search
CPC .......... G06F 8/60; G06F 21/10; G06F 9/3851; G06F 9/30145; G06F 9/44521;
(Continued)

(56) References Cited

U.S. PATENT DOCUMENTS

| | | | |
|---|---|---|---|
| 10,180,895 B2 * | 1/2019 | Ben-Natan | G06F 16/13 |
| 2004/0255291 A1 * | 12/2004 | Sierer | G06F 8/61 717/174 |

(Continued)

FOREIGN PATENT DOCUMENTS

EP    2746931 A1    6/2014

OTHER PUBLICATIONS

Tunc et al., Autonomic Cross-Layer Management of Cloud Systems, 6 pages (Year: 2017).*
(Continued)

*Primary Examiner* — Thuy Dao
(74) *Attorney, Agent, or Firm* — Fletcher Yoder, P.C.

(57) ABSTRACT

Project format, suitable to define functions and/or characteristics of an operator interface device or of a PLC of an operating machine, more generally of an industrial device. The project format comprises a base layer and a plurality of additional layers disposed in order on the base layer from the oldest to the newest.

18 Claims, 2 Drawing Sheets

(51) Int. Cl.
*G06F 9/46* (2006.01)
*G05B 19/05* (2006.01)
*G06F 8/65* (2018.01)

(58) Field of Classification Search
CPC .......... G06F 9/4488; G06F 8/61; G06F 9/455; G06F 9/45558; G06F 9/44505; G06F 8/41; H04L 67/10; H04L 67/1095; H04L 67/34; H04L 67/2823; H04L 67/329; H04L 67/02; H04L 69/329; H04L 67/567; H04L 67/75; H04L 67/565; H04L 67/306; H04L 67/08; H04L 67/01; H04N 21/643; H04N 21/8543; G07F 17/32; G07F 17/323; G05B 19/0426; G05B 19/41885
See application file for complete search history.

(56) References Cited

U.S. PATENT DOCUMENTS

| | | |
|---|---|---|
| 2007/0240096 A1 | 10/2007 | Pontoppidan et al. |
| 2011/0239190 A1 | 9/2011 | Mueller et al. |
| 2012/0054299 A1* | 3/2012 | Buck .................. G06F 21/565 709/217 |

OTHER PUBLICATIONS

International Search Report; PCT/IT2019/050111, dated Sep. 19, 2019; 2 pages.

* cited by examiner

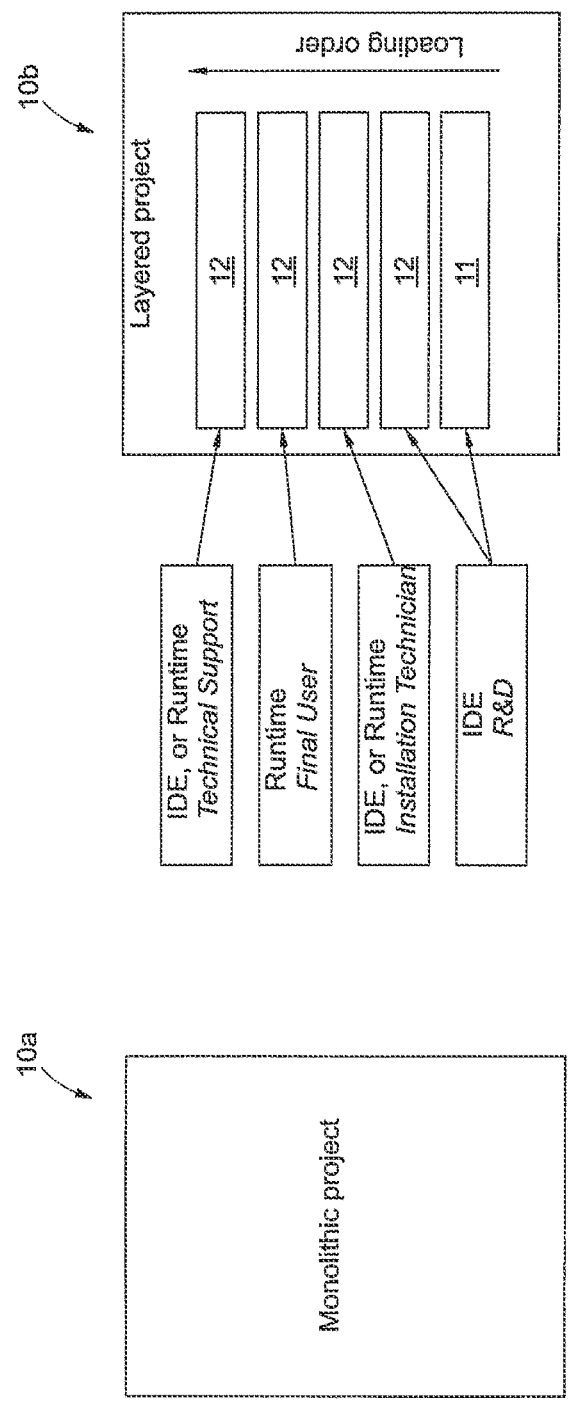

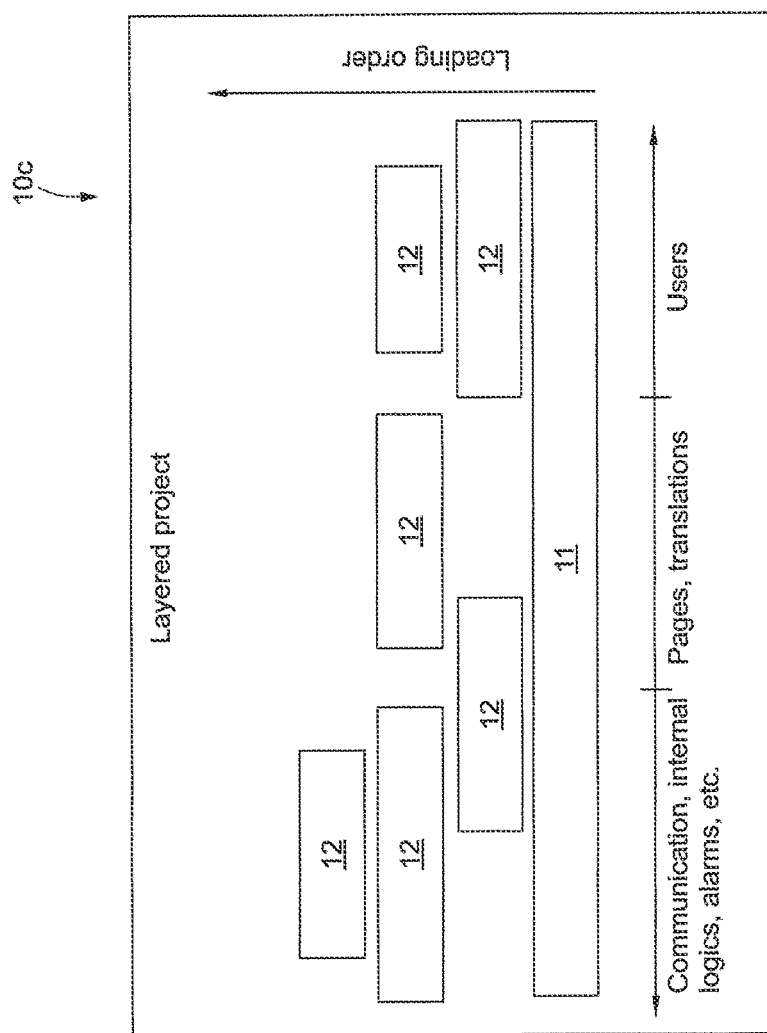

METHOD TO STORE PROGRAMS FOR OPERATOR INTERFACE AND THE MANAGEMENT OF AUTOMATION MACHINES AND/OR PLANTS AND CORRESPONDING SOFTWARE PRODUCT, OR PROJECT FORMAT FOR THE EXECUTION OF THE METHOD

CROSS-REFERENCE TO RELATED APPLICATION

This application claims benefit of and is a National Stage entry from PCT Application No. PCT/IT2019/050111, filed on May 21, 2019; which claims priority to and benefit of Italian Application No. IT102018000005547, filed on May 21, 2018, both of which are entitled "Method to Store Programs for Operator Interface and the Management of Automation Machines and/or Plants and Corresponding Software Product, or Project Format, for the Execution of the Method", both of which are herein incorporated by reference in their entirety.

FIELD OF THE INVENTION

The present invention concerns a method to manage a project format to store programs for the operator interface and to manage machines and/or plants for industrial automation.

The invention also concerns a software product to execute the storage method.

By the term software product, the present invention concerns the project format that manages the operator interface (Human Machine Interface—HMI) between user and production plant, and the implementation logic of the management of the format itself. The present invention also concerns the functioning of a control device of a machine and/or plant, that is, of any machinery or system for industrial automation, such as for example a Programmable Logic Controller (PLC).

The present invention is applied in all cases where it is necessary to manage or stabilize the functioning of an industrial device which can interact with an operating machine and/or industrial plant.

BACKGROUND OF THE INVENTION

It is known that industrial devices, used on machines and/or plants for automation, comprise a management program (runtime), which operates on the basis of a project that defines the functionalities of the machine and/or plant.

By industrial devices we intend all the hardware architectures suitable to execute specific software, normally used in the industrial sector.

In the present invention, for ease of description, we will refer mainly to HMI operator interface devices, but what is described can be extended to other industrial devices, for example SCADA (Supervisory Control And Data Acquisition) supervision devices, or to the devices that manage the operating machines, including PLCs.

It is also known that, to develop a project, it is usually necessary, or customary, to use a development environment, or IDE (Integrated Development Environment).

The IDE is structurally dedicated to the design of the functionalities of the HMI operator interface.

With the IDE, in particular, it is possible to define the interaction screens with the machine operator and configure the functionalities of the HMI, such as for example alarms, or the field variables to read or write.

The state of the art provides that the project created using the IDE is saved in one or more files, usually in proprietary format. The project in this form is called source project, since it is possible to reopen it again in the IDE for further modifications.

In embedded systems, where there are fewer hardware resources, it is common practice for the source project to be in a compiled format, that is, in the form of one or more files optimized so that the runtime program of the embedded system is able to read, interpret and execute instructions more efficiently and quickly. The compiling of the source project is instead less usual in SCADA systems. In fact, the runtime program of these systems is usually being executed on PCs that have better hardware resources than embedded systems.

The compiled project, therefore, has specific form and purpose to be executed by the runtime, but not to undergo further modifications.

Furthermore, in most cases the IDE and the runtime are being executed on two distinct hardware architectures.

The IDE normally resides on a generic PC where the developer develops the HMI project, while the runtime program resides on the operator interface device.

The transfer of the project, from the IDE to the runtime, occurs in a known manner, for example through a network in which the PC and the operator interface device are connected, or with the use of a USB key, or by other transfer means.

To execute the HMI project on the operator interface device of an operating machine and/or plant, the state of the art provides the following workflow:

design the functionalities of the operator interface on the PC, through the IDE (the design usually occurs in the technical offices of the manufacturer of the operating machine);

save the project in source format on the PC and, afterwards, possibly compile it to make it executable by the runtime;

transfer the project to the operator interface device for execution (the device is normally installed on the operating machine at the customer premises, and therefore in a building far from the manufacturer's design offices).

During the life cycle of the machine and/or of a plant, the operator interface is normally modified to satisfy, on each occasion, determinate requirements, for example requested by the plant user or by the installation technicians.

Broadly speaking, the development of the operator interface of the machine and/or plant can comprise the following operating steps:

Design step: the project can be developed ex-no vo, or it can start from a previous project, for example by creating a customized variant of a series project. Normally, the design is entrusted to the research and development staff of the manufacturer of the operating machine and/or plant, and the project is normally created at the respective technical office;

Modification of the project during the use or during the installation of the operator interface device: during the installation step it can be necessary to make modifications to the HMI, to enable interaction with the other parts of the machine and/or plant possibly designed by third parties, and therefore not compliant with the communication standards of the manufacturer. This step can be performed at the manufacturer's technical office or directly at the site where the machine and/or plant is installed during the commissioning step;

Personalization of the operator interface: this step can be requested for multiple reasons, for example due to incomplete or incorrect translations, perfecting the ergonomics, different operating needs, or for easier access to common operations. In particular, these modifications are required after the installation of the device and/or after the start of normal operating conditions;

Modification of the project in the steps following the installation: the modifications to the operator interface are implemented by the support technicians during maintenance, upgrades, adaptations to new regulatory constraints, and similar or comparable processes.

These operating steps are unsuited to the workflow that involves compiling and transferring the project to run the HMI on the operator interface device.

Another disadvantage of the known solutions derives from the fact that, in the case of specific adjustments to the operator interface, for example during the installation step, it is necessary to revisit the work flow, modifying the entire original project, or a copy thereof.

Another disadvantage of known solutions is that every modification on the project entails a modification thereof, causing the loss of the previous version.

It is possible, at most, to make a copy of the project before each variation, in order to guarantee that it is possible to return to the saved point if the new modification does not meet the requirements. If it is possible to execute the modifications to the project, as well as in the development environment, also directly on runtime, the source project format should be the same as the compiled project format to avoid transformations between the source project and the compiled one that are not very efficient.

As already mentioned previously, the runtime and the development environment are usually being executed on two distinct hardware architectures and therefore the source project is normally not optimized for the hardware performances of the operator interface device.

US 2011/0239190 describes a method for the customization of software applications, which makes it possible to modify and customize the software application, by one or more users, in a different way, without storing multiple modified copies of the application. In some embodiments, the base objects for the software application and the overlaid objects are stored in a datastore, and a runtime embodiment determines the execution of the overlaid objects instead of the base objects.

EP 2.746.931 and US 2007/0240096 describe other solutions of methods to dynamically modify software applications.

The known solutions, however, do not allow to modify the project during execution thereof by the runtime, nor to isolate the modifications based on the operating steps performed.

There is therefore the need to provide a new project format, and a corresponding storage and modification method, which overcomes at least one of the disadvantages of the state of the art.

A first purpose of the present invention is to create a project format that adapts to the operating steps of development of the operator interface. Another purpose of the present invention is to develop a project format that allows to intervene only on the part affected by the modification, and not to involve the entire project.

Another purpose of the present invention is to isolate the modifications made during one of the operating steps mentioned above, so that they can be distinguished from the modifications made during the other steps.

Another purpose of the present invention is to simplify the modification to the project, in particular, without there being the obligation to make copies of the project for each variation.

Another purpose of the present invention is to propose a project format which allows to make both temporary modifications to the HMI and also persistent ones.

According to the purposes of the invention, the modifications can be valid for a period, that is, the termination of the operator interface device is connected to a specific event.

According to further purposes of the invention, the modifications can be persistent and therefore valid even after the shutdown and subsequent restart of the runtime.

Another purpose of the present invention is to optimize a project format that allows it to be modified both by the IDE and also directly on runtime while the project itself is being executed.

Another important purpose of the present invention is to allow the modification of the project, or parts thereof, during the execution thereof by the runtime, isolating the modifications made so that they can be distinguished from the rest of the project.

Another purpose of the present invention is to propose an optimized project format, usable both by the development environment and also by the runtime, adapted for the hardware performance of the operator interface device on which the runtime is being executed.

The Applicant has devised, tested and embodied the present invention to obtain these and other purposes as highlighted below.

SUMMARY OF THE INVENTION

The present invention is set forth and characterized in the independent claims, while the dependent claims describe other characteristics of the invention or variants to the main inventive idea.

According to the present invention, in accordance with said purposes, a method to store programs for the operator interface and to manage machines and/or plants for automation, wherein the program defines the functionalities of an HMI or of a PLC, or other, initially provides the structuring of said program, or project format.

Said structuring of the program provides several layers, wherein the layers comprise at least a base layer, generally created by the research and development department of the manufacturer, and a plurality of additional layers, functionally specialized, above the base layer.

Unlike the state of the art, which provides that the program, or project format, is developed in a compact and monolithic manner, that is, consisting of a single block, the present invention describes the complete and functioning state of the project, incrementally implementing, on the base layer, in a desired and defined order, a plurality of additional layers of modifications to the project, which progress from the oldest one to the newest one.

In this regard, the program, or project format, thus developed allows to associate with each of the layers an operating step of developing the operator interface. In this way, each project layer contains all the modifications relating to at least one operating step. For example, all the modifications relating to the testing phase or to a regulatory adaptation can be contained in one layer.

Furthermore, the different layers of the project, possibly also developed by different operators, may not be modifiable by the designers of the upper layers. This guarantees a correct chain of responsibility that is easily traceable and identifiable.

It should be noted that the present invention provides the possibility of modifying the base layer, or the previous additional layers, with a certain degree of flexibility, in this case maintaining unchanged, or requiring controlled modifications, to the overlying and/or underlying layers in relation to the dominance.

It should be noted that, according to the invention, the additional layers are dynamically created during the execution of the project. In particular, with each execution of the project the additional layers can include further modifications that depend on the current execution of the project.

It is further noted, and it is a distinctive reason of the present invention, that the creation of additional layers does not materialize in a simple concatenation according to a certain order of pre-existing layers, but that the layers, with the sole exclusion of the base one, are dynamically generated at runtime during the execution of the project itself, wherein each of the modified layers contains the modifications that the operator has made using the project itself.

The additional layers can be further modified at each subsequent execution of the project, allowing continuous and consequential modifications of the layers.

According to one aspect of the invention, the project format, divided into layers, allows to develop different projects starting from the same base (possibly with the addition of one or more previous layers in common).

Furthermore, the invention allows to produce, at any time, a modification layer above the others and then delete it. For example, it is possible to make modifications resulting from the experimentation to the operator interface to evaluate whether to implement certain functionalities in the HMI.

According to a further aspect of the invention, each layer associated with a determinate operating step, or functional modification of the project, does not necessarily have to include the whole set of functions of the operator interface device, but can refer only to a functional subset. In this case, the layers associated with an operating step of development of the HMI are positioned parallel on the same layer in the project format, to the extent that the association is related.

According to a variant, said layers located parallel can coexist, side by side, if they do not modify the same functional subset.

According to one aspect of the invention, the method to update a software product proposed by the present invention allows to make both temporary and also persistent modifications.

Temporary modifications to the operator interface arise, and develop, in a context, also contingent, of program execution.

For example, temporary modifications can refer to movements of graphic objects within the operator interface which it is later decided to not implement definitively. Persistent modifications, which can be lasting, must remain valid even if the there is a restart of the runtime. By way of anon-restrictive example, the persistent modifications refer to the configuration of the display pages, or to the correction of a translation.

BRIEF DESCRIPTION OF THE DRAWINGS

These and other characteristics of the present invention will become apparent from the following description of some embodiments, given as a non-restrictive example with reference to the attached drawings wherein:

FIG. 1 shows a software product, or project format, according to the storage method of the state of the art;

FIG. 2 schematically shows an embodiment of a software product, or project format, according to the storage method of the present invention;

FIG. 3 shows an embodiment of a software product, or project format, according to the storage method of the present invention, wherein some levels are positioned parallel on the same layer.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

The following detailed description is provided by way of example and does not exhaust possible harmless variants or Implementations of the invention.

Embodiments of the present invention concern a project format 10, comprising a base layer 11 and a plurality of additional layers 12.

The base layer 11, in this specific non-restrictive case, includes the main functionalities of the operator interface and serves as a platform for the plurality of additional layers 12 which will progressively optimize the HMI for the specific application.

The plurality of additional layers 12 is disposed on the base in correct, chronologically sequential order, from the oldest to the newest. Each additional layer 12 represents a modification to the operator interface and produces one or more variations of the project with respect to the previous layers.

By way of example, according to a possible solution, each additional layer 12 is associated with an operating step of developing the operator interface.

It should be noted that the present invention does not refer only to the operating steps described above, given by way of example.

According to the invention, the inventive idea can be extended to other development cycles, since the additional layers 12 can be associated with any operating step of the development of the HMI.

A similar argument can be made if the present invention is used for PLC modifications or updates.

Even if the additional layers 12 are designed and disposed sequentially over the base layer 11, the present invention provides the possibility of modifying the base layer 11, or the previous additional layers 12, with a certain degree of flexibility, maintaining the additional layers 12 above unchanged or requiring minimal modifications thereto.

According to a further possible solution, the additional layers 12 already designed cannot be modified by other designers.

The project format 10 thus structured allows to develop different projects, for example HMI but not only, starting from the same base 11.

This approach guarantees the maximum re-use of the various design steps, at the same time ensuring a high flexibility in the development of the operator interface.

According to a possible solution, the project format 10 allows to construct at any moment an additional modification layer 12 above the others, and then delete it.

According to a further possible solution, each additional layer 12 of the project 10 does not involve the modification of the entire set of functionalities of the operator interface, but refers only to a functional subset present therein. The layers 12 thus defined, which belong to the same operating step of the development of the HMI, are positioned parallel on the same layer of the software product 10.

According to a further possible solution, the present invention allows to make both temporary modifications and also persistent modifications, in order to allow the project format 10 to adapt to the different circumstances defined by the specific application case. The project format 10 of the present invention allows to save the modifications with respect to the previous situation of any element of the project, or a functional subset thereof.

According to the present invention, the project format 10 allows to describe a plurality of variations between the layers that the project consists of. In particular, the variations can refer to modifications implemented with respect to the previous project layers and can be created, eliminated or modified during the development of the operator interface. In this regard, a development or storage method can be associated with the project format 10 suitable to interpret said variations and develop the complete project version. The development method according to the present invention provides to start from the base 11 and to progressively dispose the additional layers 12 referring to said variations.

According to a possible embodiment, the storage method according to the invention is suitable to manage layers that insist on independent parts of the project, but which are associated with the same operating step, and which are disposed parallel on the same layer of the project format 10.

The storage method according to the invention is able to understand, through the plurality of variations, whether the modification associated with a determinate layer is significant or not. In fact, in the case of repeated variations it is necessary to simplify the modifications that are overwritten or invalidated by the subsequent ones.

In particular, the method allows to determine whether the modifications introduced are not invalidated by the modifications present in an additional upper layer, so that only the variations significant for the project in its entirety are preserved.

Furthermore, the storage method also intervenes in the case in which the designers modify the base layer 11 or the lower additional layers 12, managing to resolve possible conflicts in the additional layers 12 above.

It is clear that modifications and/or additions of parts may be made to the software product, and to the corresponding storage method, as described heretofore, without departing from the field and scope of the present invention.

It is also clear that, although the present invention has been described with reference to some specific examples, a person of skill in the art shall certainly be able to achieve many other equivalent forms, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A programmable device, comprising an operator interface stored in a memory for operating an industrial machine, wherein the programmable device is configured to:
retrieve a project program from the memory, wherein the project program corresponds to a project format, wherein the project format comprises:
a base layer configured to control a first set of functionalities of the operator interface; and
a plurality of additional layers, wherein the plurality of additional layers is disposed in a chronological order on the base layer, and wherein each additional layer of the plurality of additional layers is configured to be created dynamically at runtime during execution of the project program;
execute the project program;
complete execution of the project program; and
re-execute the project program, wherein the plurality of additional layers is configured to be dynamically modified at runtime during the re-execution of the project program.

2. The programmable device of claim 1, wherein each additional layer of the plurality of additional layers is associated with an operating step for developing the operator interface.

3. The programmable device of claim 1, wherein each additional layer of the plurality of additional layers is associated with a functional subset of the first set of functionalities of the operator interface.

4. The programmable device of claim 1, wherein a first additional layer of the plurality of additional layers comprises a plurality of operating steps for developing the operator interface disposed in parallel.

5. The programmable device of claim 1, wherein the base layer cannot be modified by another group of developers.

6. The programmable device of claim 1, wherein at least one additional layer of the plurality of additional layers comprises a temporary modification.

7. The programmable device of claim 1, wherein at least one additional layer of the plurality of additional layers comprises a permanent modification.

8. A system for programming a control system for operating an industrial machine, comprising:
a processor; and
a memory communicatively coupled to the processor, wherein the memory having stored therein computer executable instructions that, when executed by the processor, cause the processor to:
retrieve a project program from a storage, wherein the project program corresponds to a project format, wherein the project format comprises:
a base layer configured to control a first set of functionalities of an operator interface; and
a plurality of additional layers, wherein the plurality of additional layers is disposed in a chronological order on the base layer, and wherein each additional layer of the plurality of additional layers is configured to be created dynamically at runtime during execution of the project program;
execute the project program;
complete execution of the project program; and
re-execute the project program, wherein the plurality of additional layers is configured to be dynamically modified at runtime during the re-execution of the project program.

9. The system of claim 8, wherein each additional layer of the plurality of additional layers is associated with an operating step for developing the operator interface.

10. The system of claim 8, wherein each additional layer of the plurality of additional layers is associated with a functional subset of the first set of functionalities of the operator interface.

11. The system of claim 8, wherein a first additional layer of the plurality of additional layers comprises a plurality of operating steps for developing the operator interface disposed in parallel.

12. The system of claim 8, wherein the base layer cannot be modified by another group of developers.

13. The system of claim 8, wherein at least one additional layer of the plurality of additional layers comprises a temporary modification.

14. The system of claim 8, wherein at least one additional layer of the plurality of additional layers comprises a permanent modification.

15. A method, comprising:
   retrieving, via a processor, a project program from a storage, wherein the project program corresponds to a project format, wherein the project format comprises:
      a base layer configured to control a first set of functionalities of an operator interface; and
      a plurality of additional layers, wherein the plurality of additional layers is disposed in a chronological order on the base layer, and wherein each additional layer of the plurality of additional layers is configured to be created dynamically at runtime during execution of the project program; and
   executing, via the processor, the project program;
   completing, via the processor, execution of the project program; and
   re-executing, via the processor, the project program, wherein the plurality of additional layers is configured to be dynamically modified at runtime during the re-execution of the project program.

16. The method of claim 15, wherein each additional layer of the plurality of additional layers is associated with an operating step for developing the operator interface.

17. The method of claim 15, comprising modifying at least one additional layer of the plurality of additional layers, wherein the modification is temporary.

18. The method of claim 15, comprising modifying at least one additional layer of the plurality of additional layers, wherein the modification is permanent.

\* \* \* \* \*